C. H. TOMLINSON.
AUTOMATIC CAR AND ELECTRIC COUPLING AND REVERSING SWITCH.
APPLICATION FILED JUNE 7, 1916.

1,381,852. Patented June 14, 1921.
3 SHEETS—SHEET 3.

UNITED STATES PATENT OFFICE.

CHARLES H. TOMLINSON, OF MANSFIELD, OHIO, ASSIGNOR TO THE TOMLINSON COUPLER COMPANY, OF MANSFIELD, OHIO, A CORPORATION OF OHIO.

AUTOMATIC CAR AND ELECTRIC COUPLING AND REVERSING-SWITCH.

1,381,852.   Specification of Letters Patent.   Patented June 14, 1921.

Application filed June 7, 1916. Serial No. 102,163.

*To all whom it may concern:*

Be it known that I, CHARLES H. TOMLINSON, a citizen of the United States, residing at Mansfield, in the county of Richland and State of Ohio, have invented certain new and useful Improvements in Automatic Car and Electric Couplings and Reversing-Switches, of which the following is a specification.

This invention relates to a car and an electric coupler mechanism located at each end of a railway car or the like so that each coupler will coöperate with a counterpart coupler located on one end of an adjacent car, together with switches which are automatically reversed or operated in both cars after the impact of the couplers to place electric connections in proper order with respect to each other and with respect to the contacts of adjacent cars.

The principal object of the invention is to provide a simple and improved construction, combination and arrangement of parts for producing the desired result.

In the accompanying drawings.

Some car couplers are so low that there is insufficient clearance between them and the ground for an electric coupler and no room above the car coupler, so that about the only practicable place is at the sides of the car coupler. If there are only a few different electrical circuits they can be duplicated on each side of the car coupler and connected in parallel so that there will be a double connection for each conductor, but if there are a great many different electrical circuits there may not be sufficient space for a double connection, one at each side of the coupler. It is impossible with conductors on both sides of the coupler to keep the circuits straight on account of the continual turning of the car end for end, in ordinary operation, and therefore it is necessary to use a reversing switch to straighten out these circuits so that there can be as many individual circuits as there are combined contacts on both sides of the coupler. This invention, therefore, contemplates the provision of means for reversing electric connections after the connection of two car couplers.

Figure 6:
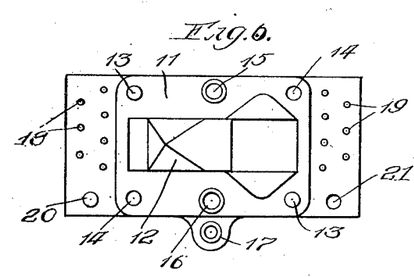
Fig. 6 is a front view of a car and electric coupler embodying the invention.

Each coupler, designated generally by the reference numeral 11, is provided with a coupling member 12 which coöperates with the coupler of an adjacent car, the faces being provided with alining projections 13 and openings 14 and hose connections 15 and 16 (see Fig. 6). Below each coupler is a combined air and electric connection 17, shown also in Fig. 2, and at the sides of the coupler are the electric plugs 18 and receptacles 19, the plug 20 being a bus line connector and the terminal 21 coöperating therewith. It is obvious, therefore, that upon the impact of the cars the main air connections, the auxiliary air and electric connections and bus line contacts are all made at the same time that the coupling members 12 are joined. A pneumatic uncoupling device 22 is also provided for withdrawing or disengaging the coupling members 12 at a predetermined time. One form of uncoupling device suitable for use in the combinations comprised in this invention is shown and described in detail in my prior Patent No. 1,223,223 issued April 17, 1917.

Figure 1:
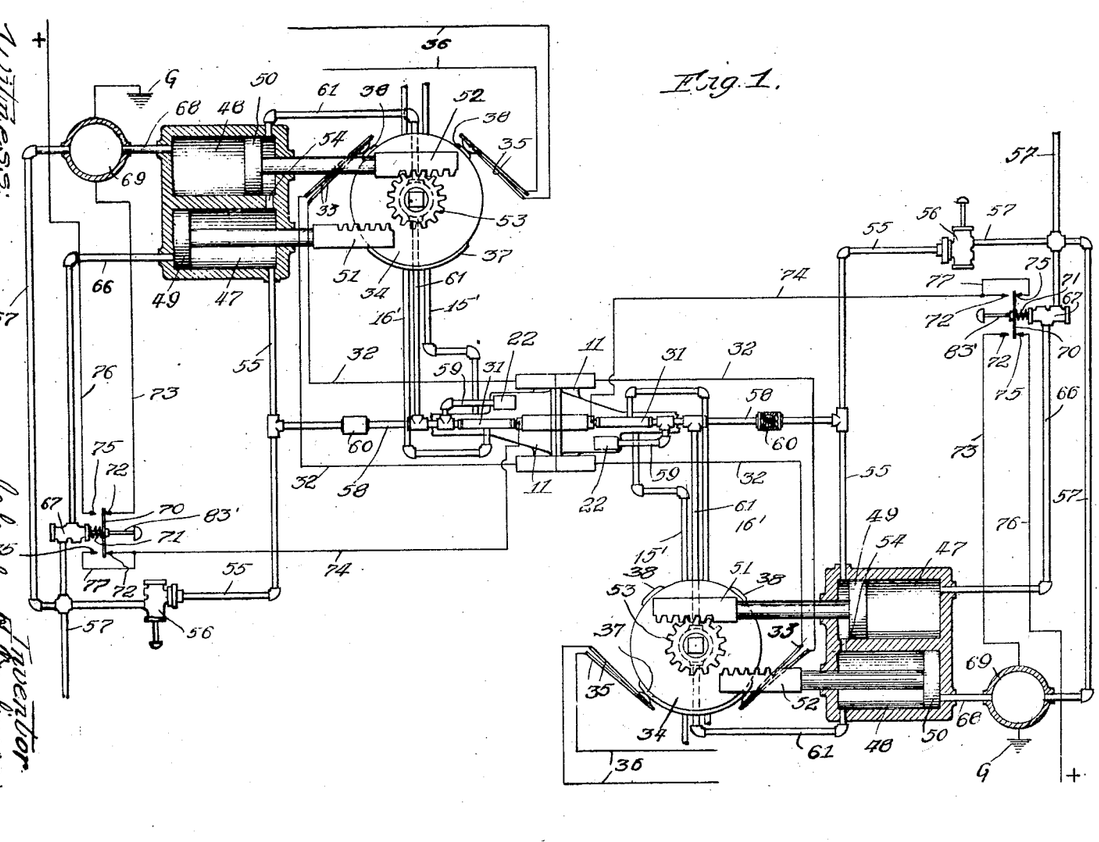
Figure 1 is a diagrammatic view embodying the invention as applied to the couplers of adjacent cars.
Figure 2:
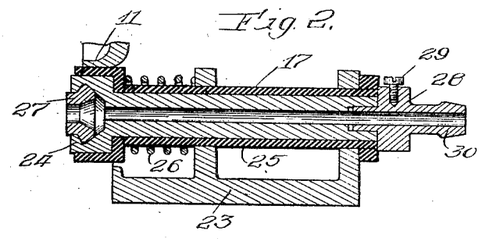
Fig. 2 is a detail section of a combination air and electric coupling.

As shown by Fig. 2, the combined air and electric coupler connection comprises a bracket 23 in which a perforated conductor 24, surrounded by insulation 25, is slidable with a spring 26 tending to press the outer end of the tubular conductor beyond the face of the coupler. In its outer end this member 24 is provided with a yielding washer 27 of rubber or some yielding material which projects beyond the face of the conductor 24 but is compressible to make a fluid-tight joint between the connectors when the couplers are brought together and at the same time permitting an electrical connection to be made between the conductors 24. At the rear end of the conductor 24 is an attachment fitting 28 having a terminal screw 29 for an electrical connection and a head 30 for the attachment of a connecting hose 31.

Figure 9:
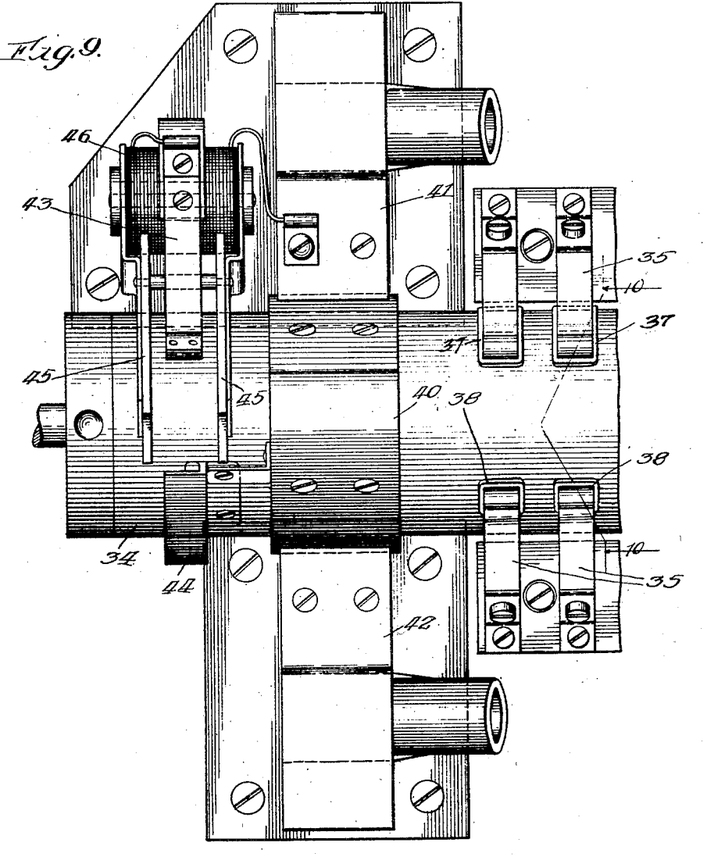
Fig. 9 is a view of one end of a reversing drum showing the bus bar switch and the magnetic blowout.
Figure 10:
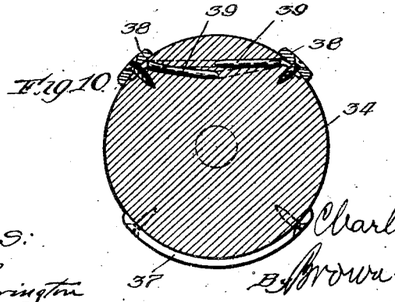
Fig. 10 is a sectional view of the drum showing the reversing connections.

Connected to each of the electrical plugs 18 and receptacles 19 are conductors 32 which have spaced contact brushes 33 bearing against a rotatable reversing drum 34. Corresponding with these terminal brushes 33 are an equal number of terminal brushes 35 from which the conductors 36 lead to the various controlling and operating circuits of the car. The reversing drum carries a number of contacts 37 which make direct connection between each pair of brushes 33 and 35 and contacts 38 have cross-connections 39, as shown in Fig. 9, to reverse the connections between the brushes 33 and 35. It is to be understood that each end of each car is provided with the coupler above described and the reversing drum for changing the circuit connections automatically when two cars are brought together so that the electrical conductors in each car will be connected to corresponding operating parts. Although only one set of conductors is shown connected to the terminals at each side of the coupler, it is to be understood that there are as many separate conductors as there are terminals or contacts at each side. At one end of the drum 34, as shown more clearly in Fig. 9, is a contact 40 embracing substantially half of the circumference of the drum adapted to make connection between bus line terminals 41, 42 when in one position but breaking connection when moved out of engagement with one of them. A magnetic blow-out is connected to the terminals 41, 42 and comprises spaced contacts 43 and 44, one of which is positioned between poles or terminals 45 of a magnet 46 of which the winding is interposed between the said terminal 41 and the contact 43 so that when the arc forms between the contacts 43 and 44 the magnetic lines of force passing between the poles 45 will tend to extinguish the arc.

In order to rotate the reversing switch a pair of equal diameter cylinders 47 and 48 are provided which have pistons 49 and 50 respectively, to operate racks 51 and 52 connected to the pistons. These racks are both adapted to engage a gear 53 secured to the reversing drum 34, but engage the gear on opposite sides thereof so that they tend to rotate it in opposite directions. The cylinders are connected at their forward ends by a passage 54 and extending from one of the cylinders 47 at the forward end is a pipe 55 which leads through an uncoupling valve 56 to a fluid pressure supply line 57. This supply line is connected to a reservoir usually carried beneath the car. Between the cylinder 47 and the uncoupling valve 56 a tubular member 58 is connected to the pipe 55 which leads directly to the combination air and electric connector 17 through the hose 31.

Figure 3:
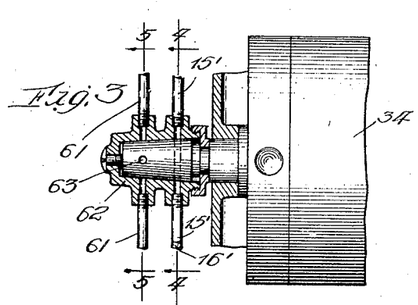
Fig. 3 shows a controlling valve attached to each reversing drum.
Figure 4:
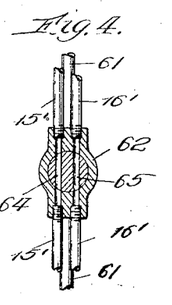
Fig. 4 is a sectional view on the line 4—4 of Fig. 3.
Figure 5:
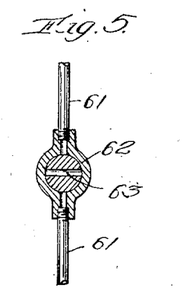
Fig. 5 is a sectional view on line 5—5 of Fig. 3.

A pipe 59 connects the uncoupling cylinder 22 with the tubular connection 58 adjacent the coupler and a check valve 60 is interposed in the tubular connection adjacent the pipe 55. Intermediate these two connections is another tubular means 61 which is connected to the front end of the other cylinder 48 through a valve 62 (see Figs. 3 and 5) at one end of the reversing drum 34. This valve has a single passage 63 for making connection between the tubular means 61 and at another point, as shown by Figs. 3 and 4 is provided with two passages 64 and 65 at right angles to the passage 63 for making connections with the tubular means 15' and 16' respectively, which are connected to the main air lines of the coupler having the terminals 15 and 16, respectively, in the face thereof.

At the rear of cylinder 47 is a pipe 66 connected through a valve 67 with the supply line 57, the other cylinder 48 is connected by means of a pipe 68 through an electropneumatic valve 69 with the supply line 57.

To energize the electro-pneumatic valve 69 the valve 67 carries a contact 70 which is normally pressed by a spring 71 against a pair of contacts 72. One of these contacts 72 is connected by means of a conductor 73 to the electro-pneumatic valve 69 and thence to ground G and the other contact 72 is connected by means of a conductor 74 with the terminal screw 29 of the combined air and electric connector 17. A pair of contacts 75 are also arranged to be engaged by the contact 70 and one of these contacts 75 is connected by means of a conductor 76 with a suitable source of current supply, while the other contact 75 is connected by means of a conductor 77 with the conductor 74. Thus the contact 70 normally connects the electropneumatic valves 69 of a pair of abutting cars through the couplers to ground. If, however, the contact member 70 in one car is pressed against the contacts 75 a circuit will be completed from the source of electrical supply in one car through the coupler and the electro-pneumatic valve of the other car.

Figure 7:
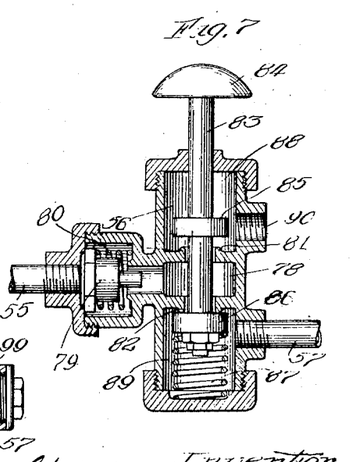
Fig. 7 is a sectional view of a three-way valve.

The uncoupling valve 56 comprises a housing with a central chamber 78 (see Fig. 7) to which the pipe 55 is connected through a check valve 79. This check valve has a spring 80 which normally holds the valve open, but when there is a rush of fluid under pressure it will close the pipe, thus allowing the passage of fluid under pressure even in the checking direction. At the opposite sides of the chamber 78 are valve seats 81 and 82, and extending through the chamber and out of one end thereof is a valve stem 83 preferably having a handle or knob 84 for operating it at the end. Valves 85 and 86 are secured to the stem and coöperate with the valve seats 81 and 82 respectively, a spring 87 tending to hold the valve 86 on its seat 82. These valves 85 and 86 are movable in chambers 88 and 89 respectively, the former of which is connected through an opening 90 to the atmosphere while the other chamber is connected through fluid pressure supply line 57. The valve stem 83 passes loosely through the valve seats, thereby allowing the fluid under pressure to escape around the stem when either valve is raised from its seat. When the stem 83 is pressed down against the spring 87 the valve 85 engages the seat 81 and a connection is made from the supply line 57 through the chambers 89 and 78 and through check valve 79 to the pipe 55.

The valve 67 is similar in construction to the valve 56 with the exception that the check valve 79 is not necessary, the valve stem 83' being made longer so that the contact member 70 can be secured thereto.

Figure 8:
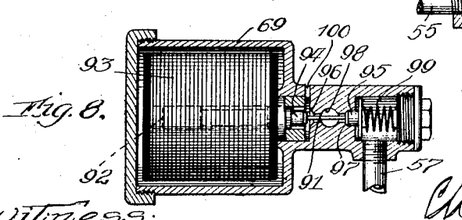
Fig. 8 is a sectional view of an electro-pneumatic valve.

As shown by Fig. 8 the electro-pneumatic valve 69 has a stem 91 carrying a core 92 attracted by a winding 93 when the magnet is energized, the stem carrying valves 94 and 95 which coöperate with the opposite valve seats 96 and 97. An intermediate opening 98 is provided for the pipe 68 and the valve 95 under normal conditions is held seated by means of a spring 99. An opening 100 is provided on the side of the valve 94 opposite the opening 98 so that when the magnet 93 is not energized there will be a free connection between the opening 98 and the opening 100 through the valve 94. When the magnet is energized the valve 94 will be seated opening the valve 95 so that the fluid under pressure can pass from the supply line 57 through valve 95 and through opening 98 and pipe 68 to the rear of cylinder 48.

The operation of this invention is as follows: Upon the impact of the cars or their couplers the operator in one of the cars presses the combination air valve 67 and electric switch which allows the air from the supply line of the car in which he is to pass through the pipe 66 to the rear of the cylinder 47 forcing the piston outwardly, the rack 51 thereof engaging and rotating the reversing switch 34 accordingly. This operation also completes the circuit from the source of current supply in the operator's car through conductor 76, contacts 75 and 70, conductors 77 and 74 and through the combination electric couplers of both switches and thence through conductor 74, contact 70 and conductor 73 of the other car through the electro-pneumatic switch 69 of the said other car so that the electro-pneumatic valve on the other car is energized. This allows air to pass from the supply line 57 of the opposite car through the electro-pneumatic valve to the rear of cylinder 48 thereby forcing the piston 50 outwardly and by the engagement of rack 52 turning the reversing switch 34 of the opposite car so that all of the contacts of the reversing switch in the opposite car correspond with the contacts already made in the reversing switch of the car in which the operator is located. This operation also establishes connection of the main air lines to the valve 62, as shown in Fig. 4. At this time the air line 61 is closed through the valve 62 since the passage 63 is at right angles to its open position. From this it is also evident that the engagement of either rack 51 or 52 with the gear 53 moves the reversing switch approximately a quarter of a revolution so that when both of the pistons of the cylinders 47 and 48 are in their neutral or retracted position the reversing drum contacts will not make connection between the brushes 33 and 35. It is to be understood, of course, that the combined air and electric switch 67 is held down or open only a sufficient time to complete the connections above described which will remain in the position stated as long as desired since there is no force tending to change the connections. The front and rear of each cylinder is thereupon open to atmosphere through the valves 56, 67 and 69.

In order to uncouple the cars the uncoupling valve 56 in one of the cars is operated or pressed which admits fluid under pressure from the supply pipes 57 through the pipe 55 to the forward end of cylinder 47 and thence through the tubular connection 54 to the forward end of the cylinder 48. This fluid under pressure cannot pass directly through the tubular member 58 because of the check valve 60, but after both of the pistons 49 and 50 are retracted or returned to neutral position the reversing switch in the operator's car will be moved one quarter of a revolution which operates the valve 62 breaking the circuit between the main tubular members 15' and 16' through the passage 63 and completing the tubular connection 61. The fluid under pressure then passes through the combination air and electric connectors 17 of both cars building up a pressure in the uncoupling cylinder 22 which uncouples the coupler heads and passing through the check valve 60 of the opposite car builds up a pressure in both of the cylinders 47 and 48 of the opposite car, retracting both of its pistons and returning the reversing switch 34 to its neutral position.

Thus it will be seen that the single passage 63 of the valve 62 acts as an interlock to prevent the operation of the uncoupling cylinder 22 of either coupler until the reversing switch 34 in the operator's car has been operated which will break the connection between the contact brushes 33 and 35 and also between the main or bus line switch contacts 41 and 42, the magnetic blow-out taking care of the arc to prevent burning of the bus line switch contacts. In their neutral or normal condition all of the pistons are retracted and the switch contacts are all open. It is obvious, of course, that the air in passing through the couplers by-passes into the pipe 59 for operating the uncoupling cylinders 22, this action occurring after the switch in the operator's car has been moved to neutral position so that there is no possibility of uncoupling the cars until after the electric connections are broken, thereby preventing any arc between the electric connections on the coupler heads.

It is understood, of course, that this coupling mechanism is illustrated as combined with the well-known type of automatic air brake systems in which the car brakes are set automatically when the air brake line is opened to permit escape of air to the atmosphere. With such an air brake system it is apparent that the cars if uncoupled will be held by the brakes from movement whenever the electric switch is closed because when the electric switch is closed the valve controlling the air brake system will be opened and the brake set. This makes it impossible to move the cars into coupling relation at a time when the electric switch is closed. It will also be apparent that in case the mechanical couplings are disengaged by hand or otherwise and an attempt is made to separate the cars, such separation will be prevented, for as soon as the couplers are moved relative to one another a sufficient amount to permit escape of air from the hose connections 15 and 16 the brakes on the cars will be set and further movement of the cars stopped. The various connections on the face of the coupler shown in Fig. 6 are automatically coupled with corresponding connections on the coupler of a coöperating car by the impact of the cars when brought together. It is usual in an electric train to employ the bus line circuits connected by the contacts 20 and 21 for conducting the current to the motors in the different cars. It is important therefore that, in uncoupling, the current through the bus lines shall be broken before an attempt is made to separate the cars. If the mechanical couplers are disengaged and the motorman in the forward car starts his motor to separate the connected cars, the same time that he introduces current into the motor of the forward car, the same controller action will permit current to enter the motor of the trailer unless the circuit connecting the two cars has been broken. In such a case the trailer would start to follow the forward car although not mechanically coupled therewith and would continue to follow until the two cars were separated by chance and the electrical connection between them broken. Such unexpected movement of the trailer might, and on certain occasions has resulted in serious injuries. With applicant's invention such operation would be impossible for the reason that means is provided for preventing uncoupling of the cars until the switches have been opened, and also for the reason that if a mechanical uncoupling should by any chance be effected while the switch is still closed, the instant that the cars were separated the least bit air would escape from the brake system and the brakes would be set preventing further movement of the cars. This is true because it is impossible to have the switch and the brake valve closed at the same time.

I claim:

1. The combination with car and electric couplers for a plurality of circuits, of a combined air and electric connector on each coupler, reversing switch mechanism in each car for the electric coupler circuits, and means in each car operable through said connector for controlling the said mechanism in both cars.

2. The combination with counterpart car and multiple electric couplers, of electric reversing switch mechanism for the circuits of each coupler, means for operating both mechanisms from one car when two cars are coupled, and means to prevent uncoupling until the reversing switch in at least one car is opened.

3. In apparatus of the class described, an electric coupler having a plurality of contacts and circuit connections, a reversing switch therefor, fluid pressure means for operating the switch in either direction, and means for preventing uncoupling until the reversing switch is open.

4. The combination with an electric coupler for a plurality of circuits, of a rotatable reversing and disconnecting switch therefor, means comprising fluid pressure cylinders and pistons for rotating the switch in either direction, and means for admitting fluid under pressure to the same end of both cylinders for disconnecting the switch.

5. The combination with an electric coupler for a plurality of circuits, of a rotatable reversing switch therefor, a pair of cylinders with means in connection therewith for rotating the switch in either direction, and a common connection between the cylinders at their forward ends so that the means thereof can be retracted.

6. The combination with an electric coupler for a plurality of circuits, of a rotatable reversing switch therefor, means comprising a pair of cylinders with pistons for rotating the switch in either direction, a common connection between the cylinders at their forward ends, and a manually operable valve for controlling the admission of fluid under pressure to the forward ends of the cylinders.

7. The combination with an electric coupler for a plurality of circuits, of a rotatable reversing switch therefor, means comprising a pair of cylinders with pistons therein for rotating the switch in one direction or the other, and a manually operable valve to admit fluid under pressure to one of the cylinders only for moving its piston in a forward direction.

8. The combination with an electric coupler for a plurality of circuits, of a rotatable reversing switch therefor, means comprising fluid pressure cylinders with pistons therein for rotating the switch in either direction, and an electro-pneumatic valve for admitting fluid under pressure at one end of one of said cylinders.

9. The combination with an electric coupler for a plurality of circuits, of a rotatable reversing switch therefor, means comprising a pair of cylinders with pistons therein for rotating the switch in either direction, means for admitting fluid under pressure to the forward end of the cylinders, a manually operable valve for admitting fluid under pressure to the rear of one cylinder, and an electro-pneumatic valve for admitting fluid under pressure to the rear of the other cylinder.

10. The combination with an electric coupler for a plurality of circuits, of a rotatable reversing switch therefor, a pair of cylinders having pistons and means for rotating the switch in one direction or the other, a source of fluid pressure supply, a manually operable valve for admitting fluid under pressure to the forward end of the cylinders, an electro-pneumatic valve for admitting fluid under pressure from the supply to the other end of one of the cylinders, and a manually operable valve to admit fluid under pressure from the supply to the other end of the other cylinder.

11. The combination with a pair of electric couplers for a plurality of circuits, of a rotatable reversing switch for the circuits of each coupler, means for rotating the switch in either direction comprising a pair of fluid pressure cylinders, a manually operable valve for admitting fluid under pressure to one of the cylinders, an electro-pneumatic valve for admitting fluid under pressure to the other cylinder, an electric contact carried by said manually operable valve, and conductors for completing a circuit connection from one car through the said contact and through the couplers to the electro-pneumatic switch of the other car.

12. The combination with a car and electric coupler with circuits leading therefrom, of car coupler air controlling lines, a reversing switch for the electric coupler circuits, and a valve carried by the reversing switch to complete the car coupler air controlling lines when the reversing switch is operated.

13. The combination with counterpart car and electric couplers including electric circuits, of car controlling air lines, a reversing switch mechanism for the electric coupler circuits, means in each car for operating the reversing switches in both cars, and a valve carried by each reversing switch mechanism for closing the connection through the said car controlling air lines only when the reversing switch mechanism in each car has been operated.

14. The combination with a car and electric coupler including circuits leading therefrom, of reversing switch mechanism for the electric coupler circuits, fluid pressure means for operating the reversing switch, means for operating said fluid pressure means comprising an electric switch, and a combination air and electric connection carried by the coupler and connected both to the said fluid pressure means and to the electric switch.

15. The combination with a car and electric coupling including circuits leading therefrom, of fluid pressure connecting means carired by the car coupler, a reversing switch for the electric coupler circuits, fluid pressure means for operating the reversing switch, a reversing switch air line connector carried by the coupler, and a double valve carried by the reversing switch having passages to register with the coupler air lines when the switch is in one position and having a single passage to complete connection through the reversing switch air line when the reversing switch is in another position.

16. The combination with a car and electric coupling, of air line connections carried by the car coupling, a reversing switch for the electric coupler circuits, a fluid pressure uncoupling device for the car coupler, reversing switch valves, means controlled by the operation of the reversing switch to operate the valves to open the air line connections in one position and to open connection to said device in another position, and to prevent uncoupling of the car coupler until the reversing switch is in a predetermined position.

17. The combination with counterpart car and electric couplers including circuits leading therefrom, of a reversing switch for the circuits of each coupler, fluid pressure means for operating each switch, a fluid pressure supply line, manually controlled means for admitting fluid under pressure to said means, a valve carried by each switch, a tubular connection from the switch operating means to the coupler opened through said valve when the switch is in one position, tubular means joining the said connection adjacent the coupler and connected to the supply line between the manually controlled means and said fluid pressure means, and a check valve in the said tubular means to allow fluid under pressure to pass only in a direction away from the coupler.

18. In a car, air and electric coupler, the combination with air connecting means including valves, and electric connecting means including contacts and circuits therefor, and an operative means having a single unitary member operable to open and close the valves and circuits.

19. In a system for controlling the coupling of cars, electric circuits, and fluid pressure lines for trains; means operable by the movement of the cars for automatically coupling and holding said cars, electric circuits, and fluid pressure lines in coupled relation; controlling means for said electric circuits comprising a switch for making or breaking the circuits; controlling means for said fluid pressure lines comprising valvular means for opening and closing said fluid pressure lines; and connecting means between said electric and fluid pressure controlling means to insure simultaneous operation of said switch and valvular means.

20. Mechanism for controlling the electric circuits and air pressure lines of cars having automatic air brake systems; said mechanism comprising couplers for said cars having electric contacts carried thereby and automatically brought into engagement upon impact of said cars, air line connectors on said couplers held in coöperative relation thereby when said cars are coupled but disconnected when said cars are moved away from one another, a switch for controlling said electric circuits, a valve for controlling said air lines, and means for interconnecting said switch and valve to hold said valve open when said switch is closed and thus cause operation of said automatic air brake system to set the brakes of said cars when the engaging faces of said couplers are separated.

21. In car, air and electric couplers, the combination with a mechanical coupling which is interlocked upon impact of the coupler heads, of air connecting means and electric connecting means comprising contacts and engaged upon impact and circuits leading therefrom, both of which coöperate with corresponding parts when the mechanical coupling is made, and means controlled by manual operation for simultaneously completing the air and electric connections through adjacent coupler heads after the mechanical coupling is made.

22. The combination with a mechanical coupler, of air and electric connecting means including an air valve and contacts with circuits leading therefrom, a pneumatic operating device for controlling said air valve and for opening and closing said circuits, and an electro-responsive device for controlling the operation of the pneumatic operating device in one direction after the mechanical coupling is made.

23. The combination with counterpart car and electric couplers, of electric circuits carried through each car, a rotatable reversing switch for the circuits of each car, said switches, each having a neutral position, means for rotating each switch in either direction from the neutral position, and controlling means in each car for rotating the reversing switch in one car in one direction and that in the adjacent car in the other direction.

24. The combination with car, air and electric coupling means including air hose and electric contact connections made upon impact and circuits leading from the contacts, of a valve for the air hose, a switch for said circuits connected to the valve, and means for operating the switch to straighten out the circuits and open the valve after the car is coupled.

25. The combination with car, air and electric coupling means including air hose and electric contact terminals connected upon impact and circuits leading from the terminals, a valve for the hose, a reversing switch for said circuits having a neutral position and connected to the valve, and means for operating the switch to straighten out the circuits and open the valve after the car is coupled.

26. The combination with car, air and electric coupling means including air hose and electric contact terminals connected upon impact and circuits leading from the terminals, a valve for the hose, a reversing switch for said circuits having a neutral position and connected to the valve, air uncoupling means for the car including a valve also connected to said switch, and means for operating the switch to straighten out the circuits and open the air hose valve in either of the reversing positions and to open the uncoupling valve only in its neutral position.

27. The combination with a plurality of electric train line circuits, of a switch for controlling said circuits, a fluid pressure train pipe, a valve device operated by fluid pressure for controlling communication through the train pipe, fluid pressure controlled means for operating the switch and a manually operated valve for controlling the fluid pressure for actuating said valve device and switch.

28. In an automatic car, air and electric coupling system, the combination with an electric circuit and exposed electrodes, of an air brake system, means for controlling the fluid therein, a switch for opening and closing the electric circuit, means for operating the switch and fluid controlling means together whereby the exposed electrodes are deënergized and the fluid controlling means closed, and means for preventing uncoupling of the car, air and electric couplers until said switch has been opened and said fluid controlling means closed.

29. In an automatic car, air and electric coupler, the combination with an electric circuit and electrodes therefor protruding beyond the coupler, of an air brake system, a switch for opening and closing the electric circuit, a valve for opening and closing the air system, means for connecting the switch and valve, a device for operating said valve and switch together to insure the closing of the switch and the opening of the valve together, or vice versa, and means for preventing uncoupling of said car, air and electric coupler until the operating device for said switch and valve has been actuated to open said switch and close said valve.

30. In a car coupler system, the combination with an electric circuit connected with the car and having exposed electrodes, of an air brake system carried by the car and having a valve at the end of the car, a switch at said end, means for interconnecting said switch and valve to operate in unison with one another, and fluid pressure means for compelling the switch and valve to be operated together to deënergize the exposed electrodes and close the valve.

31. A car, air and electric coupler having an electric circuit carried through cars to be coupled and an air pressure line for said cars, a switch for said electric circuit, a valve for said air pressure line, means for interconnecting said switch and valve to operate in unison with one another, and means for preventing uncoupling of the cars until said switch and valve are operated to open said switch and close said valve.

32. Controlling means for air pressure lines and electric circuits between two cars comprising a valve in each car for controlling the air lines, a switch in each car for controlling the electric circuits, means for interconnecting said controlling means for simultaneous operation, and automatic locking means operated by impact of said cars for holding said air lines and electric circuits in coupled relation.

33. Controlling means for air pressure lines and electric circuits between two cars comprising a valve in each car for controlling the air lines, a switch in each car for controlling the electric circuits, means for interconnecting said valve and switch for simultaneous operation, a coupler on each car arranged to automatically engage the coupler of a coöperating car upon impact of said cars, said coupler having a contact face, an electric terminal carried on said face to automatically connect with an electric terminal of a coöperating car upon impact of said cars, means for electrically connecting said terminal on said coupler with said switch on said car, an air pressure line connector on said coupler face for automatically connecting with an air pressure line connector on a coupler of a coöperating car upon impact of said cars, a conduit for connecting the air line connector on said coupler with the valve on said car, and coupling means on said coupler for automatically engaging coupling means on the coupler of a coöperating car upon impact of said cars for holding the faces of said couplers together and securing said electric terminals and said air line connectors in coöperative relation.

34. The combination with car, air and electric couplers each comprising a mechanical coupler, air and electric connecting means, a combined air and electric connector, means for opening the air connections and closing the electric connections simultaneously, said means comprising a fluid pressure device, an electro-responsive device to control the operation of the fluid pressure device in one direction, and fluid pressure means to control the operation of the fluid pressure device in the other direction, the said fluid pressure means and the electro-responsive device of two adjacent couplers being connected by the combined air and electric connectors of the two adjacent couplers.

35. In a car coupling system, the combination with an electric circuit connected with the car and having exposed electrodes, of an air brake system carried by the car having a valve at the end of the car, a switch at said end, means for coupling said electric circuit and said air brake system operated automatically by the impact of the cars when the cars are moved together, and means for interconnecting said switch and valve for compelling said switch and valve to be operated together to deënergize the exposed electrodes and close the valve.

36. Coupling mechanism for a car having an electric circuit and an automatic air brake system provided with a fluid pressure train line; said mechanism comprising a contact for the electric circuit arranged to automatically connect said circuit with the circuit of a coöperating car on impact of said cars, means for automatically connecting said train line circuit with the train line circuit of said coöperating car on impact of said cars, a car coupler automatically operable on impact of said cars to secure the electric contacts of said cars and the connecting means for the pneumatic pressure train lines of said cars in connecting relation, a switch for controlling the said electric circuit, and means connected with said switch and operable in unison therewith for controlling said air brake system to cause the brakes of said car to be set for preventing coupling or uncoupling of said car while said switch is closed.

37. Controlling means for air pressure lines and electric circuits between two cars comprising a valve in each car for controlling the air lines, a switch in each car for controlling the electric circuits, means for interconnecting said controlling means for simultaneous operation, automatic locking means operable by the impact of the cars for holding said air lines and electric circuits in coupled relation, and means for preventing disconnection of said automatic locking means until said controlling means has been operated to open said switch and close said valve.

38. Controlling mechanism for fluid pressure lines and electric circuits between two cars comprising means in each car for controlling the fluid pressure lines, means in each car for controlling the electric circuits, means for connecting the electric and fluid controlling means in one car with the electric and fluid controlling means in the adjacent coupled car, said electric and fluid controlling means being operable from either car, simultaneously in both cars, and automatic locking means operable by impact of said cars for holding said fluid pressure lines and electric circuits in coupled relation.

39. Controlling mechanism for fluid pressure lines and electric circuits between two coupled cars comprising a valve in each car for controlling the fluid pressure lines, a switch in each car for controlling the electric circuits, means for interconnecting said valve and switch in each car for simultaneous operation, operating means in each car for the valve and switch in said car, means for connecting said operating means in adjacent cars, means operable from either car for simultaneously actuating the operating means for the valves and switches in adjacent coupled cars, and automatic locking means operable by impact of said cars for holding said fluid pressure lines and electric circuits in coupled relation.

40. Mechanism for coupling and controlling fluid pressure and electric circuits between coupled cars comprising coöperating coupling heads provided with means for coupling the fluid pressure and electric circuits, a plurality of electric train line circuits, a switch for controlling said circuits, a fluid pressure train pipe, a valve device operated by fluid pressure for controlling communication through the train pipe, fluid pressure controlled means for operating the switch, and a manually operated valve for controlling the fluid pressure for actuating said valve device and switch.

In testimony whereof, I have signed my name to this specification, in the presence of two subscribing witnesses, on this 31" day of May, A. D. 1916.

CHARLES H. TOMLINSON.

Witnesses:
A. LYMAN PRICE,
C. V. MARKS.